May 9, 1939.  D. CRABTREE  2,157,528

MACHINE FOR FORMING COMPRESSED FEEDS AND SIMILAR PRODUCTS

Filed May 15, 1936  5 Sheets—Sheet 1

DUANE CRABTREE
INVENTOR

Samuel S. Jacobson
ATTORNEY

May 9, 1939.　　　　D. CRABTREE　　　　2,157,528
MACHINE FOR FORMING COMPRESSED FEEDS AND SIMILAR PRODUCTS
Filed May 15, 1936　　　5 Sheets-Sheet 2

DUANE CRABTREE
INVENTOR

Samuel J. Jacobson
ATTORNEY

May 9, 1939.　　　　　D. CRABTREE　　　　　2,157,528
MACHINE FOR FORMING COMPRESSED FEEDS AND SIMILAR PRODUCTS
Filed May 15, 1936　　　　5 Sheets-Sheet 3

DUANE CRABTREE
INVENTOR

Samuel S. Jacobson
ATTORNEY

May 9, 1939.　　　D. CRABTREE　　　2,157,528
MACHINE FOR FORMING COMPRESSED FEEDS AND SIMILAR PRODUCTS
Filed May 15, 1936　　　5 Sheets-Sheet 4

DUANE CRABTREE
INVENTOR

Samuel S. Jacobson
ATTORNEY

May 9, 1939. D. CRABTREE 2,157,528
MACHINE FOR FORMING COMPRESSED FEEDS AND SIMILAR PRODUCTS
Filed May 15, 1936 5 Sheets-Sheet 5

DUANE CRABTREE
INVENTOR

Samuel Jacobson
ATTORNEY

Patented May 9, 1939

2,157,528

UNITED STATES PATENT OFFICE 2,157,528

MACHINE FOR FORMING COMPRESSED FEEDS AND SIMILAR PRODUCTS

Duane Crabtree, Springfield, Oreg., assignor to Western Pellet Machine Corporation, Eugene, Oreg., a corporation of Oregon Application May 15, 1936, Serial No. 79,933

27 Claims. (Cl. 107—8)

This invention relates to machines for forming compressed feeds and similar products of the type in which mixtures of various substances and of different consistencies are continuously forced through a ring-shaped die member which contains a plurality of openings of the desired shape and size through which these mixtures are extruded in a molded condition and which are finally cut into the length desired to produce a product of predetermined texture and length.

The present practice in producing pellets or like products generally consists in the use of a machine embodying the conveyor feed worm principle for conveying the material to be processed and, at the same time, for compressing the material as it is conveyed, then forcing said material through a die plate and, finally, severing the material as it comes out of the openings in the die plate. The conveyor feed worm and die plate principle is well known in this and other arts, and experience has indicated that it requires a considerable amount of power to operate such pellet making machines efficiently and that their depreciation factor is out of proportion to the results obtained. The quintessence of my invention is that it does not embody any of the principles incorporated in the machines referred to above.

Briefly stated, my invention contemplates the embodiment in a machine of a ring-shaped member which forms the molding die, a supporting frame to which the molding die may be secured and means operatively associated with said molding die whereby the material to be processed into the desired products may be forced through spaced openings in the molding die. The invention, also, contemplates the use of one or more cutting members, which is or are disposed relative to the outer face of the molding die and which cuts or cut into the desired length the molded material as it is extruded through the openings in the die. The number of cutting members used determines the length of the ultimate product resulting from the operation. The invention, also, embodies means for feeding the material to be processed into the machine. The operation of the feeding means, the pressing or forcing means and the cutting members are correlated so that each moves in a predetermined sequence with respect to the other.

The primary object of my invention is to provide a machine for continuously feeding and compressing plastic, semi-plastic or other substances, either in a cold or other state, in order to produce feeds and similar products by forcing said substances through a molding die and continuously severing the extruded substances into predetermined lengths.

Another object of the invention is to provide a revolving member, having a plurality of independent rollers adjustably mounted thereon by which the material to be molded is continuously pressed through the die member, and to also provide a feeding mechanism, the movement of which is correlated with the movement of the revolving member in order to feed the materials to be molded into the machine in such a manner as to practically prevent the overflow or packing of the machine by the materials being processed.

A further object of the invention is to provide a machine which effects a considerable saving in cost and time and which requires a comparatively small amount of energy for its operation in proportion to its output.

Still another object of the invention is to provide a machine possessing few parts and which is capable of being easily and quickly cleaned, repaired or assembled for service, as occasion may require.

Other objects and advantages and the nature and characteristic features of my invention will be more clearly understood from an examination of the accompanying drawings, when they are considered in conjunction wtih the following description, both being essential parts of this specification.

Figure 9:
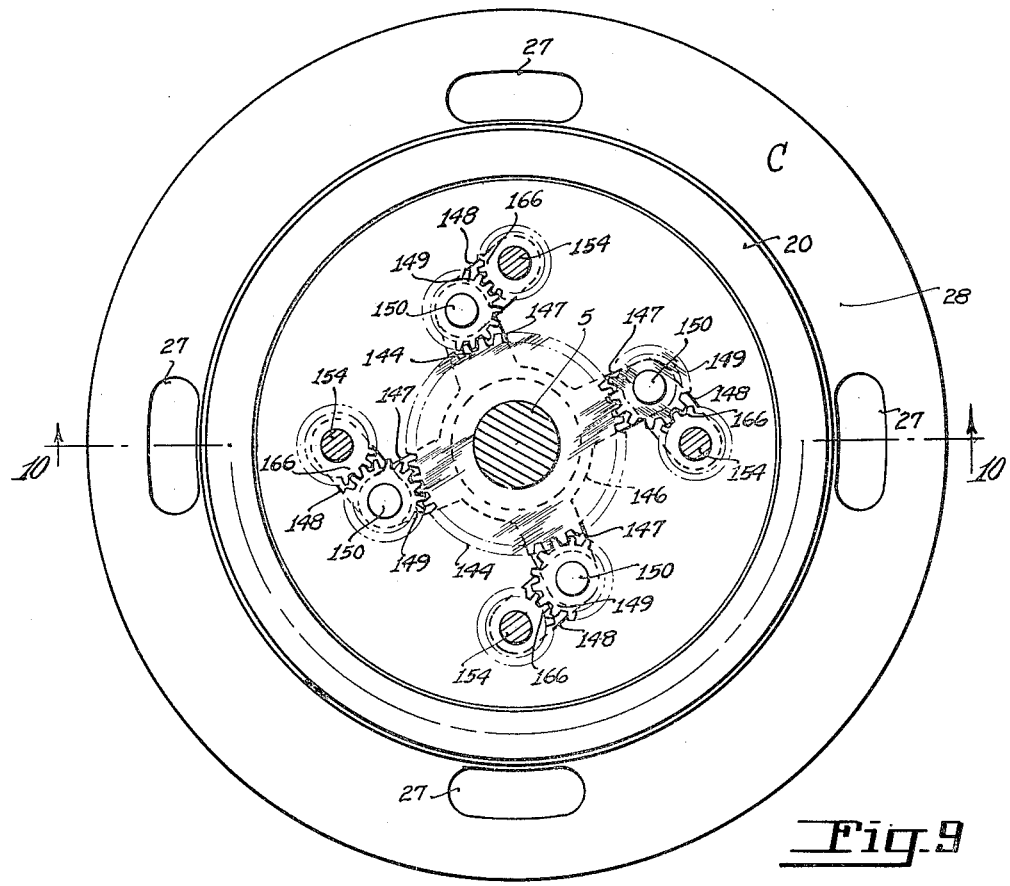
Figure 9 is a sectional, plan view of the machine with the addition of means for actuating the rollers, (see line 9—9 of Figure 10) but in other respects is substantially similar to the machine shown in Figures 1 to 8 inclusive.
Figure 10:
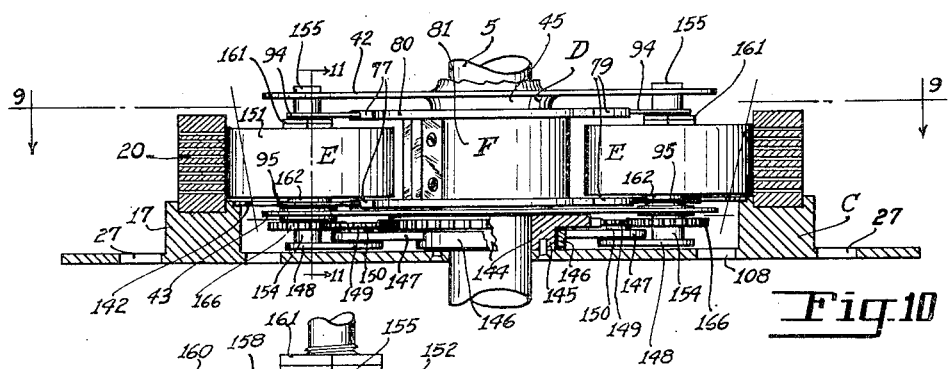
Figure 11:
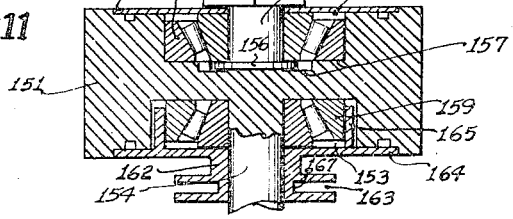

Figure 10 is a side view, partially in section, taken on line 10—10 of Figure 9 looking in the direction indicated; and Figure 11 is a sectional, side view, taken on line 11—11 of Figure 10 looking in the direction indicated, showing the construction of a roller capable of being actuated by the mechanism shown in Figures 9 and 10.

Corresponding and like parts are referred to in the following description and designated in the several views of the drawings by like reference characters.

Figure 1:
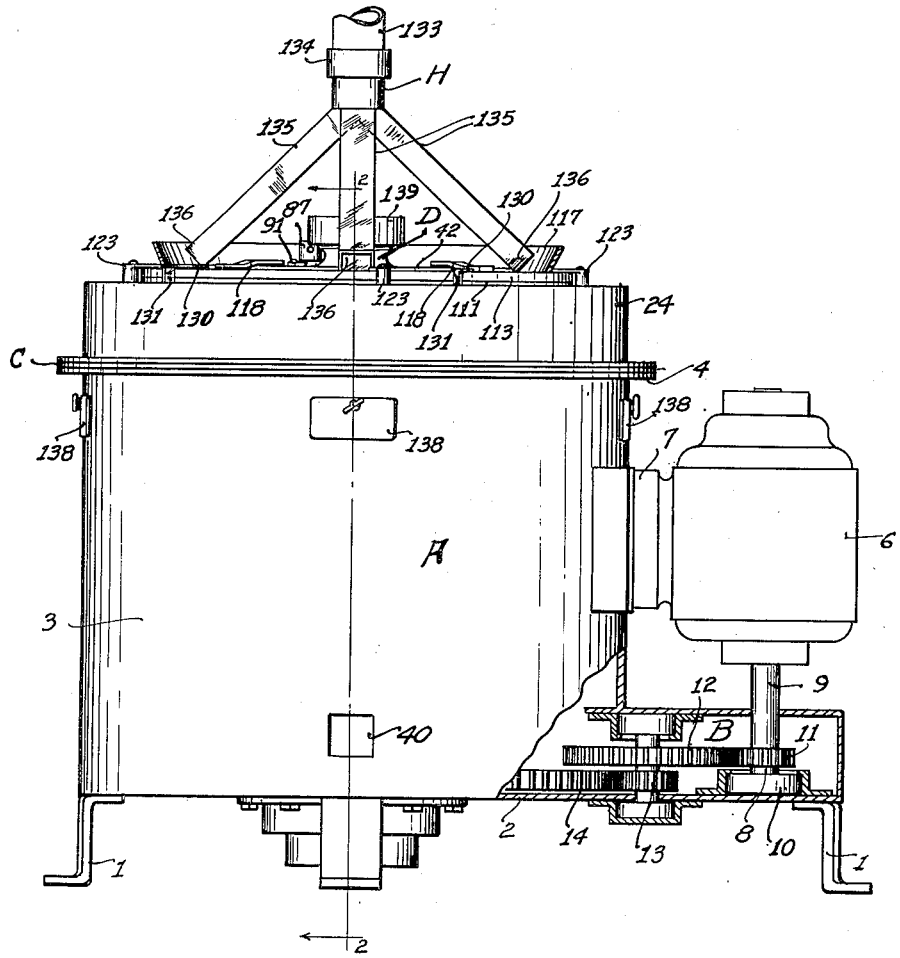
Figure 1 is a side elevation of the machine embodying the principles of my invention, a portion of the machine being shown in cross section to illustrate the driving mechanism for the main shaft.

There is disclosed in Figure 1, a supporting frame, generally designated by reference character A, consisting of a plurality of legs 1, a base 2, a cylindrical wall 3 and an annular flange 4. The main shaft 5, shown in Figure 2, may be driven by any suitable means from a source of drive commonly used for this type of machine. A convenient arrangement for this purpose is illustrated, by way of example only, in Figure 1, and consists of a prime mover 6 secured in any desirable manner to wall 3 of frame A as by wall bracket 7, so that the end 8 of shaft 9 is journaled in bearing 10 conventionally secured to base 2. A speed reducing unit, indicated generally by reference character B, is operated by the prime mover 6. This is accomplished by having a gear wheel 11 secured to shaft 9 which registers and meshes with gear wheel 12, suitably journaled within the confines of the casing of the speed reducing unit B. Secured to the same shaft as gear wheel 12 is still another gear wheel 13 of much smaller diameter than gear wheel 12, and this gear wheel 13 registers and meshes with main gear 14, only a portion of which is shown in Figure 1, but the full view of which may be seen in Figure 2.

It should be appreciated that other means of driving the machine may be used without affecting its function. By removing the prime mover and substituting therefor a shaft journaled in proper bearings provided with a pulley and driven from a line shaft or other suitable source of power, the same results may be accomplished. By referring to Figure 2, it will be seen that gear wheel 14 is secured to main shaft 5 and that the shaft is suitably journaled in bearing 15, capable of resisting rotational stress, and bearing 16, capable of resisting end thrust created by the weight of the unit upon the main shaft. These bearings are conventionally secured to the base 2 of the frame.

A supporting block, designated generally by reference character C, rests upon and is secured in a conventional manner, to flange 4. An annular die supporting member 17 extends upwardly from the supporting black C and possesses an annular groove 18 within its top surface 19.

A ring-shaped die member 20, having a large number of parallel openings 21 passing through its cylindrical wall, has its base 22 snugly seated within groove 18, and is removably secured to the annular die supporting member 17 by any suitable means, as by bolts 23 passing through the member 17 and being threaded into the base 22. The ring-shaped die member 20 may be made of any material suitable for producing pellets or like products, but experience has indicated the desirability of using a bronze alloy in the fabrication of the die.

A skirt 24 is spaced from, but completely encircles the outer face 25 of the die 20 and, also, the die supporting member 17. The skirt 24 extends upwardly from and is secured to flange 4 immediately above supporting block 21 in any conventional manner. By this arrangement, a circumferential chamber or well 26 is formed between the die 20 and the skirt 24. A number of openings 27 are formed within the floor 28 disposed between the skirt 24 and the die supporting member 17.

Main shaft 5 extends vertically from base 2 of the frame A, passes through supporting block C and is journaled in a conventional bearing 29, which, itself, is suitably secured to the under side of the supporting block C. A retaining collar 30 is secured to the shaft and abuts against the under side of the bearing 29 in order to prevent the upward movement of the shaft.

An annular inclined receiving trough 31 is secured within the interior 32 of the frame A. A collar 33 extends upwardly from the base 34 of the trough and surrounds shaft 5. Keyed to and surrounding shaft 5 and collar 33, is hub 35 which has sweeping arms 36 extending from its side. Suitable packing, as shown at 37, is placed between the collar 33 and the hub 35 to insure against any of the processed materials from entering the interior 32 and thus destroying the effectiveness of the lubricants contained therein.

An inclined chute 38 is secured to that portion of base 34 which has opening 39 therein, and the chute is, also, secured to wall 3 of frame A, as shown at 40. When the processed material enters into the trough 31, it falls towards the base 34. The rotation of shaft 5 causes the hub 35 and its arms 36 to rotate and since the arms 36 are adjacent the base 34, the processed materials are swept into chute 38 through its connection with opening 39 and thence it travels to the sifting apparatus not shown here.

A surface bearing plate 41 is secured by any desirable means to the upper surface of the supporting block C and surrounds the main shaft 5, but does not hamper the rotation of the shaft. A double flanged member, designated generally by reference character D, has an upper flange 42 and a lower flange 43 which forms therebetween an annular channel 44. A hub 45 spaces the two flanges 42 and 43 from each other and permits the double flanged member D to be disposed about shaft 5 so that lower flange 43 slidingly rests upon the surface bearing plate 41. The hub 45 is secured against independent rotation around the shaft 5 by being removably secured to the shaft by any desirable means as by being keyed thereto, as shown at 46. Upper flange 42 has a plurality of open ended slots 47 formed therein, spaced equi-distant from each other and opening at the periphery 48 of said flange. Lower flange 43, also, has a plurality of open ended slots 49 formed therein, spaced equi-distant from each other and opening at the periphery 50 of said flange. Slots 47 and 49 are of the same size and shape and are in registerable alignment with each other.

A plurality of rollers, designated generally by reference character E, are rotatably and adjustably disposed within the annular channel 44 between the upper flange 42 and lower flange 43. The construction of each of the rollers E may best be seen from a study of Figure 3. Each roller has an opening 52 therethrough. A spindle 53, having a collar 54 thereon, is disposed within and extends beyond the opening 52. A tapered roller bearing 55 is disposed within opening 56, so that its inner race 58 is snugly positioned about spindle 53 and its outer race 59 is snugly positioned against the peripheral face 60 of the opening 56. Another tapered roller bearing 62 is disposed in spaced relation to bearing 55 within opening 63 so that its inner race 65 is snugly positioned about spindle 53 and its outer race 66 is snugly positioned against the peripheral face 67 of the opening 64. A packing plate 68 is disposed about spindle 53 and upon the underside 69 of roller body 61. This plate rests upon collar 54. Another packing plate 70 is disposed about spindle 53 and upon the top side 71 of roller body 61. These packing plates insure against the possibility of foreign matter entering into roller bearings 55 and 62, and thereby destroying their value. Threaded members 72 are threadably disposed about spindle 53, and, when threaded securely against packing plate 70, the inner races 58 and 65 of roller bearings 55 and 62 respectively and the spindle 53 are locked with each other, thus permitting the rotation of the roller body 61 about spindle 53. The roller body 61 is preferably constructed of hardened steel, but other substances, having a high resistance to wear may be used.

Figure 2:
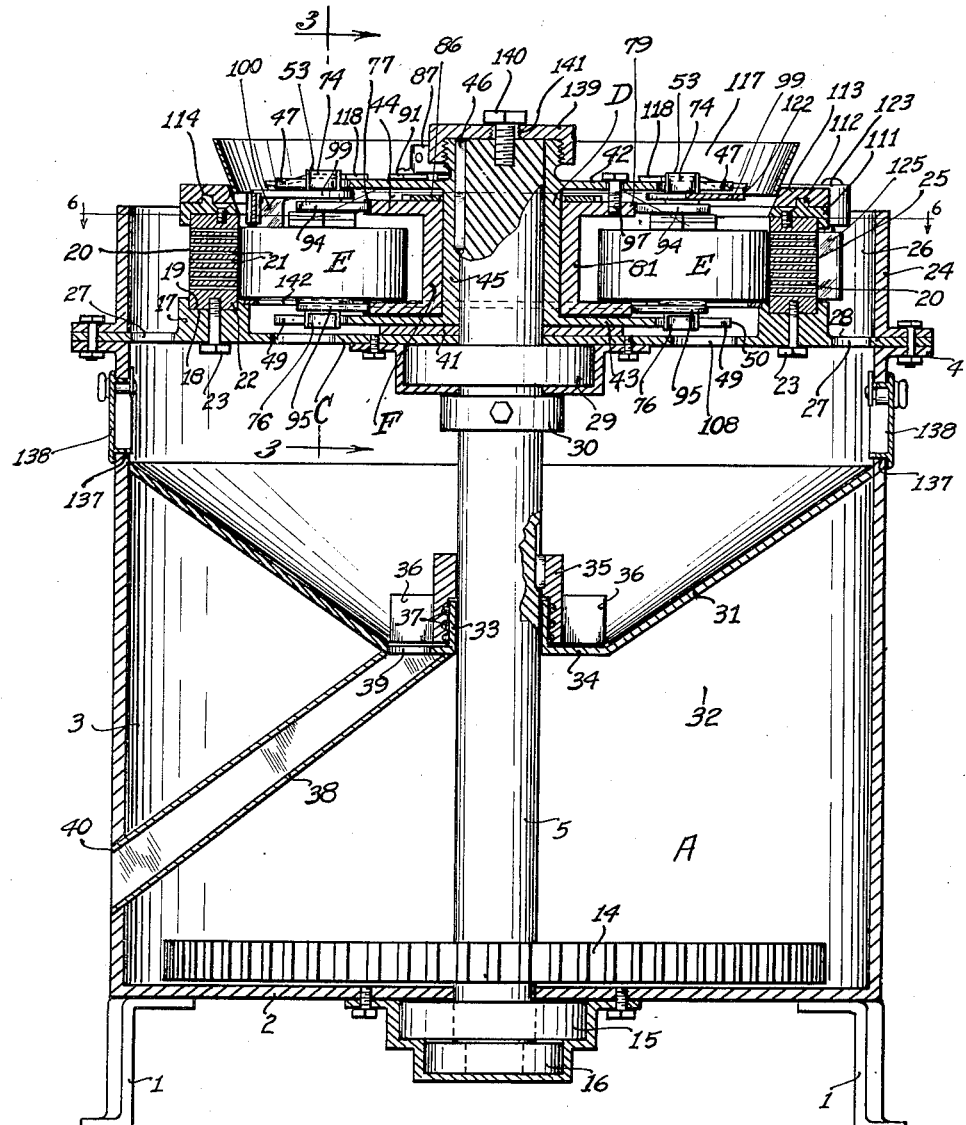
Figure 2 is a sectional, side elevation of the machine embodying the principles of my invention with the feeding mechanism removed, taken on line 2—2 of Figure 1 looking in the direction indicated, and more graphically illustrating the structural details of the machine.
Figure 4:
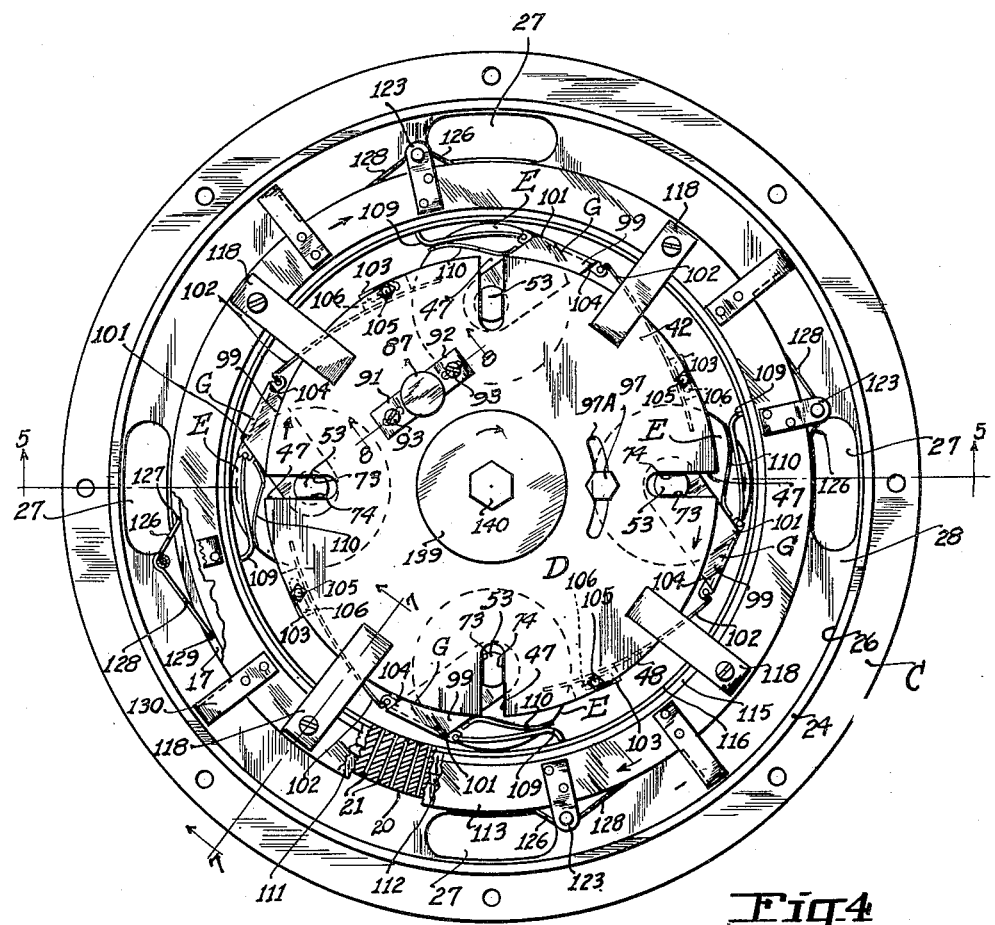
Figure 4 is a plan view of the machine shown in Figure 2 with portions broken away to show the details of construction of some of the parts of the machine.

Each of the spindles 53 have parallel faces 73 and 74 adjacent one end and parallel faces 75 and 76 adjacent the other end. Faces 73 and 74 are movably positioned within open ended slots 47, and faces 75 and 76 are movably positioned within open ended slots 49. By this means, the spindles 53 are prevented from rotating when the roller bodies 61 rotate, and radial adjustment of each of the rollers E may be made by means soon to be described. This arrangement is best shown in Figures 2 and 4.

Figure 6:
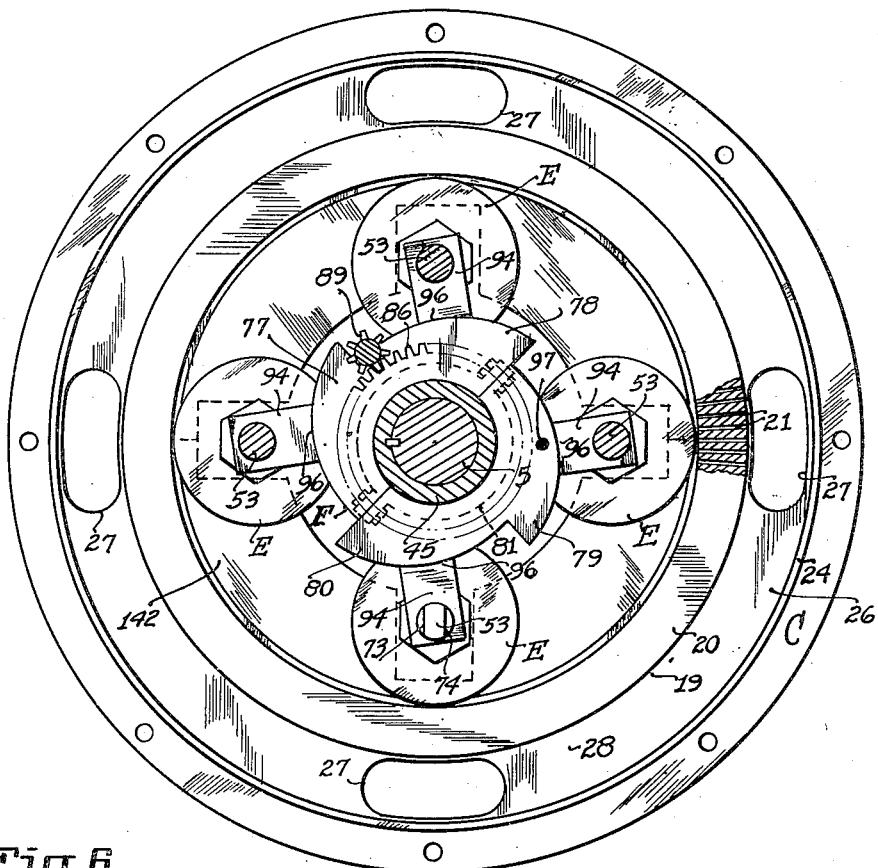
Figure 6 is a sectional, plan view of the machine, taken on line 6—6 of Figure 2 looking in the direction indicated, disclosing the cam assembly for adjusting the rollers.
Figure 8:
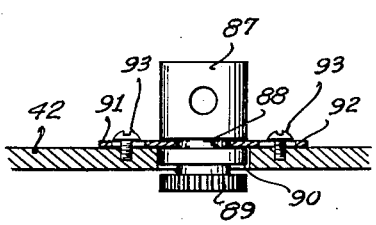
Figure 8 is a sectional, side view, taken on line 8—8 of Figure 4 looking in the direction indicated, showing the actuating means for the cam assembly.

A split multi-cammed member, designated generally by reference character F, is movably disposed about hub 45 and rotates, when desired, within annular channel 44. Member F is split to allow its placement about hub 45. This member F has a plurality of integral cams, 77, 78, 79 and 80 formed outwardly from the upper end of its hub 81 and a plurality of like cams 82, 83, 84 and 85 formed outwardly from the lower end of hub 81. Cams 77 to 80 inclusive and 82 to 85 inclusive are of the same shape and size and are positioned to be in respective registerable alignment with each other. A gear wheel 86 is secured in a conventional manner to the upper end of hub 81. A turning knob 87, having an annular recess 88 therein, and having a gear wheel 89 secured to its lower end, passes through an opening 90 within the flange 42. The knob 87 is retained in rotatable relation with respect to the flange 42 by a pair of slotted plates 91 and 92, which have their concave ends fitted into the annular recess 88, as graphically shown in Figure 8. These plates 91 and 92 are adjustably secured to the upper face of flange 42 by suitable means, in this instance, by threaded screws 93. Gear wheel 89 meshes at all times with gear wheel 86, as shown in Figure 6. Disposed about each spindle 53 is a pair of cam shoes 94 and 95, one disposed on the upper end and one underneath the spindle and both being in parallel alignment with each other. Cam shoes 94 and 95 have concave cam surfaces 96 and 97 respectively, which conform to the periphery and ride at all times against the cams 72 to 80 inclusive and cams 82 and 85 inclusive respectively.

It may now be determined that, by rotating turning knob 87, rotational movement is imparted to the multi-cammed member F, and, as a consequence of such rotation, cams 72 to 80 inclusive and cams 82 to 85 inclusive force the cam shoes 94 and 95 to move. Each of the rollers F, by virtue of their association with spindles 53, and because of the cam shoes 94 and 95 being disposed about the spindles 53, is capable of radial adjustment by the movement of the multi-cammed member F, and, since the cams are all alike in shape and size, the adjustment of each roller E is correlated, they each are adjusted an equal distance. When it is desired to prevent the rotation of the multi-cammed member F, and when it is desired to lock the rollers E against radial movement, threaded bolt 97, which passes through curved slot 97A formed within flange 42, is threaded within one of the cams extending from the upper end of hub 81 so that upper face of gear wheel 86 is frictionally engaged against the face of flange 42, as shown in Figures 2 and 4.

Figure 5:
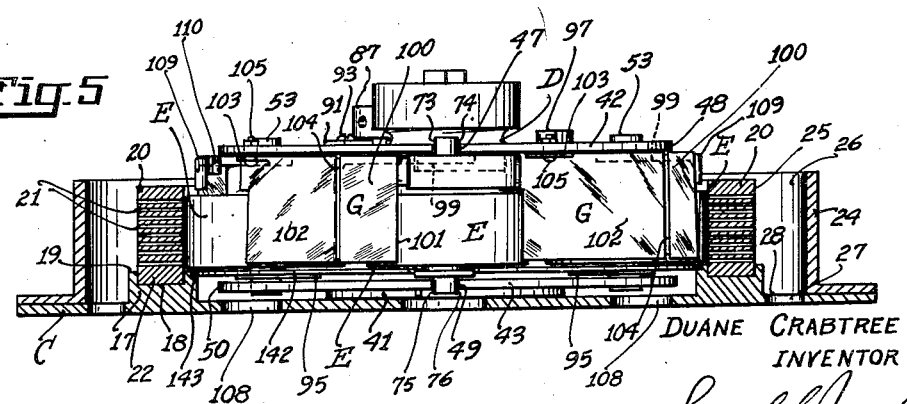
Figure 5 is a side view, partially in section, taken on line 5—5 of Figure 4 looking in the direction indicated.

In order to gradually advance toward the die the materials being processed and to assist in the compression of the material prior to its extrusion by the action of rollers E through the die, a feeder assembly, generally designated by reference character G, is associated with each of the rollers E and are generally disposed within the annular channel 44. There is a feeder assembly G, each having the same characteristics, for each of the rollers E. A description of one of the feeder assemblies will, therefore, suffice for the others. An angle arm 99 is movably secured about spindle 53, and its portion 100 extends downwardly with its side 101 being disposed adjacent the roller body 61 so that its surface lies tangentially to the outer periphery of the roller E. A plate 102, which has an integral slotted ear 103 formed on the upper edge thereof, is hingedly secured to the side 104 of angle arm 99. A bolt 105 passes through slot 106 of ear 103 and through flange 42 and a nut is threadably secured about said bolt. By this arrangement, plate 102 may be adjustably locked against flange 42. It immediately becomes apparent that, by virtue of this construction, the area between the inner face of die 20 and the feeder assembly G, just described, may be increased or decreased to suit the requirements for the operation of the machine and the processing of materials of various consistencies. Both the downwardly extending portion 100 and plate 102 are correspondingly inclined inwardly so that they are closer to the lower portion of the inner face of the die 20 than they are to the upper portion of the inner face of die 20. This feature may be viewed in Figure 5. The object of this construction is to create a resistance against the natural downward movement of the materials being processed in order to prevent the materials from "packing" at the bottom, which is usually caused by the weight of the materials being processed and in order to provide a more even distribution of the material around the inner face of die 20 and thus permits the production of pellets of uniform density. Each feeder assembly G, as heretofore described, associated with each of the rollers E, tends to direct the material being processed towards the inner face of the die and slightly compresses the material prior to the final extrusion of the material through the die by the roller E. If, however, some of the material being processed does find its way below flange 43, openings 108 are provided through supporting block C, which permits this material to fall into trough 31.

Figure 7:
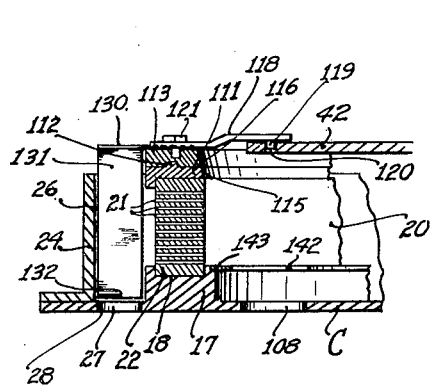
Figure 7 is a fragmentary, sectional, side view, taken on line 7—7 of Figure 4 looking in the direction indicated, disclosing in detail some of the parts of the machine.

A scraper plate 109 is hinged to side 101 of angle arm 99 and is tensioned against the inner face of the die 20 by a resilient element, such as spring 110 secured to angle arm 99 and riding on the back of the scraper plate. The purpose of this is to clean any material which adheres to that portion of the die 20 which does not come into contact with rollers E. This may best be seen in Figures 4 and 5. An annular flanged reinforcing ring 111 is secured in any conventional manner to the top of the die 20. An annular projection 112 is disposed on the top of ring 111 and forms a trackway. A companion annular ring 113 has an annular groove 114 within its under side and is positioned upon ring 111 so that the groove 114 coincides and registers with the annular projection 112. Attention is called to the fact that the inner faces 115 and 116 of ring 111 and ring 113 are tapered so that they may receive thereon an inverted frusto-conical member 117 to be more fully described. The annular ring 113, which is adapted for rotation upon the flanged annular ring 111, is secured to the flange 42, by a plurality of supporting arms 118. Referring to Figure 7, it will be seen that each of these supporting arms 118 has a downwardly extending projection 119, which fits into an opening 120 disposed within the flange 42 and that the other end of each of the supporting arms 118 is secured against ring 113 by any suitable means as by threaded bolt 121. In this manner, rotation is imparted to the annular ring 113, when the double flanged member D is rotated. Referring now to the inverted frusto-conical member 117, there are as many cut-out portions 122 within the lower periphery of this member as there are supporting arms 118, so that this inverted frusto-conical member is permitted to freely rest upon the arms 118 and, also, permits its lower periphery to pass beyond the tapered surface of inner face 115 and 116 of the annular ring 111 and 113, thus forming a substantially tight connection between the member 117 and the rings 111 and 113 in order to prevent the material being fed into the machine from overflowing into well 26.

Knife blade supporting arms 123 are also secured to annular ring 113 in any desirable manner and extend slightly beyond ring 113. Secured to and depending downwardly from each of these arms is a knife blade 125. Each blade consists of a member 126, which has the cutting edge 127 therein and a tension member 128. The cutting edge 127 of member 126 and the end 129 of tension member 128 ride upon the outer face of die 20. This construction permits the cutting edge of the knife blade to be retained under tension against the outer face of the die and yet prevents the knife blade from damaging the outer face of the die as it rotates therearound and cuts the material being extruded through the die by the action of the rollers E. These knife blades 125 are positioned about ring 113 so that there is an equal distance between them and so that they are slightly in rear of the open ended slots formed within the flanges 42 and 43. Furthermore, the length of the extruded material may be increased by removing some of the knives.

A plurality of sweeper supporting arms 130 are also secured in any desirable fashion to the ring 113 and are normally disposed in rear of the blade supporting arms 123. Each of these sweeper supporting arms 130 has depending therefrom and secured thereto in any adequate manner a sweeper element 131 of the type shown in Figure 7, so that its end 132 almost contacts the floor of well 26. This arrangement results in the cut pieces of extruded compressed material, which have fallen into the well 26, being swept through openings 27 into trough 31.

The machine is provided with a feeding mechanism, designated generally by reference character H, which consists of a central delivery chute 133, the end of which is surrounded by a loose fitting collar 134 to which is joined a plurality of feeding chutes 135, thus permitting independent movement of the feeding chutes from the delivery chute 133. The discharge end 136 of each of these feeding chutes 135 rests upon the rim of the flange 42 immediately in front of the supporting arm 118, so that, as the flange 42 rotates, the feed chutes 135 rotate. By the arrangement thus described, the material is continuously fed and equally distributed within the machine.

A plurality of openings 137 are disposed through wall 3 of frame A so that easy access may be gained to bolts 23 when it is desired to remove the die 20. Doors 138 cover these openings when not in use and are locked against the wall 3 in any suitable manner.

A cap 139 is threadably secured to the top of hub 45, and a bolt 140 passes through an opening 141 within the cap and is threaded into the top of shaft 5. This arrangement prevents the double flanged member D from being lifted off of shaft 5.

A false floor 142 rests upon annular shoulder 143 formed within die supporting member 17 and thus keeps the materials being processed from going beyond the flange 43 of member D.

In Figures 9 to 11 inclusive is shown a slightly modified form of construction consisting of means for actuating the rollers, which, themselves, are slightly modified in order to permit their actuation. Around shaft 5 is disposed a stationary gear wheel 144, which is fixedly secured to die supporting block C in any well known manner. The double flanged member D rests upon the top of gear wheel 144, thereby eliminating the bearing plate 41. Gear wheel 144 has an annular shoulder 145 and collar 146 is rotatably disposed about said shoulder. A plurality of arms 147, shown in dotted line position in Figure 9, extend outwardly from the collar 146 at right angles to each other. A link 148 is movably secured to and positioned under each one of the arms 147, and an idler gear 149 is disposed above each of the arms 147 and is secured to shaft 150, which is common to link 148 and idler gear 149.

Figure 3:
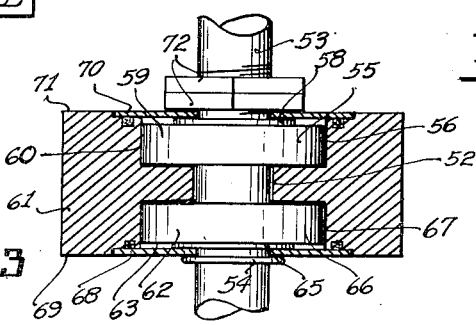
Figure 3 is a sectional, side view, taken on line 3—3 of Figure 2 looking in the direction indicated, showing the construction of the rollers.

Referring now to Figure 11, it will be seen that the rollers are constructed differently from the roller shown in Figure 3 and consists of a roller body 151 which has recesses 152 and 153 disposed in spaced relationship with each other. An integral stub shaft 154 extends downwardly from the roller body 151 and is surrounded by recess 153. A spindle 155 extends upwardly from the roller body 151 and is disposed centrally of recess 152 with its collar 156 being disposed upon base 157 of recess 152. A tapered roller bearing 158 is disposed about spindle 155, and a like tapered roller bearing 159 is disposed about stub shaft 154. Packing plate 160 seals bearing 158 to prevent any foreign matter from entering therein, and the inner race of bearing 158 is held securely against the spindle 155 when threaded members 161 are threaded against packing plate 160. A hub member 162 is movably disposed about stub shaft 154 and has an annular recess 163 formed adjacent its end, and, also, has extending outwardly therefrom a packing plate 164, which seals bearing 159 from the entrance of foreign matter. Extending upwardly from packing plate 164 is an annular rim 165 which extends into recess 153 and disposed therein is the outer race of tapered roller bearing 159. Secured to stub shaft 154 is a gear wheel 166, and the other end of link 148 is movably journaled about stub shaft 154, as shown at 155. Stationary gear wheel 144, idler gear 149 and gear wheel 166 are in mesh with each other at all times regardless of the movement of the rollers. The upper end of spindle 155 is identical in construction with the spindles heretofore described and is slidably positioned within the open ended slots 47 of flange 42 and is thus prevented from rotating, and the walls of the annular recess 163 fit over the upper and lower faces of flange 43 so that the sides 167 of the annular recess 163 fit into open ended slots 49. From the above described arrangement, it may be seen that, while the roller body 151 and stub shaft 154 rotate, spindle 155 and hub member 162 are held against rotation, but rotation is imparted to the roller body 151 and stub shaft 154 by gears 144, 149 and 166. Except for the changes pointed out in the above description, the rest of the machine remains the same. It will, therefore, be seen that, as the double flanged member D, is rotated about shaft 5, idler gear 149, being in mesh with stationary gear 144, is caused to rotate and transmits its rotation to gear 166, which is secured to stub shaft 154. It will be seen that, regardless of the radial adjustment which may be imparted to the rollers E as a result of the actuation of the multi-cammed member F, the gears 144, 149 and 166 will at all times be retained in mesh, because of the links 148.

*Modus operandi*

The machine, having been described in detail, its operation will now be pointed out.

The material to be processed by the machine is directed from the delivery chute 133 into the feeding chutes 135; and, since these feeding chutes rest upon the rim of flange 42 immediately in front of the supporting arms 118, the material to be processed is discharged through discharge ends 136 into the space formed between the inner surface of die 20 and plate 102. A substantially equal amount of material is discharged in this manner in front of the feeder assembly G. The rotation of the shaft and the double flanged member D being clockwise, the material is immediately acted upon by the feeder assembly G and directed toward the inner surface of the die 20 so that it is gradually compressed against the inner face of the die before the roller E forces this compressed material through the openings in the die. Each roller E offers the same pressure against the materials being processed. Consequently, the compressed material possesses substantially the same density, especially in view of the fact that the feeder assembly is so inclined as to prevent the material being processed from packing near the base of the die 20. The fact that the rollers E are capable of uniform adjustment with respect to each other by the use of a multi-cammed member F, has heretofore been pointed out and, therefore, need not be reiterated.

As the material is extruded through the openings in the die, the cutting edge 127 immediately severs the extruded compressed material and the cut pieces then fall upon the floor 28 of well 26. The sweeper plates 131 then sweep the cut pieces toward openings 27 in floor 28 and the cut material falls into receiving trough 31. Since there is an opening through the floor of the receiving trough, which connects with the discharge chute 38, and since there is keyed to the main shaft 5, sweeping arms 36, the material thus entering into the receiving trough 31, is swept into the discharge chute 38.

The principles embodied in Figures 9 to 11 inclusive do not change the general operation of the machine heretofore related. The rollers E, slightly modified as explained before, are positively actuated, but function no differently than the rollers described in connection with Figures 1 to 8 inclusive. As the shaft 5 and double flanged member D rotate clockwise, the idler gear is rotated by the stationary gear 144 and the idler gear in turn rotates gear 166, and since gear 166 is secured to stub shaft 154, which is integral with roller body 151, the roller is rotated. The material to be processed receives no different pressure from that received by the material being processed by rollers not positively actuated, but the actuation of the rollers removes the possibility of the rollers' slipping upon the surface of the material being compressed when the machine is being operated.

In order to meet specific needs or requirements for the production of feeds and similar products, not commonly processed, the design of all or portions of the machine embodying the principles of my invention, may be changed; but it should be understood that I consider within the purview of my invention all such changes in the detail of construction, which do not depart from the spirit and which fairly fall within the scope of my invention, as defined in the appended claims.

I claim:

1. In apparatus of the class described, a die supporting block, a stationary ring shaped die member removably secured to the die supporting block, an annular reinforcing ring removably secured to the top of the die member, said ring having an annular projection extending upwardly therefrom, a shaft passing through the die supporting block and rotatably disposed with respect thereto, a double flanged member secured to the shaft and disposed within the area surrounded by the die member, but in spaced relationship with said die member, each flange of said member having a plurality of open ended slots therein, the slots of one coinciding with the slots of the other, a plurality of rollers rotatably retained between pairs of said coinciding open ended slots, a multi-cammed member rotatably disposed about the hub of said double flanged member, a pair of cam arms secured to each of the rollers and adapted to normally ride against the corresponding cam faces of the multi-cammed member, means associated with the upper flange of the double flanged member for actuating the multi-cammed member to thereby simultaneously move said rollers toward or away from the inner face of the die, a plurality of feeder assemblies, one for each roller being associated with said rollers and disposed between the flanges of the double flanged member and adapted to slightly compress and direct toward the die the materials being processed, a scraper element, one for each roller resiliently held against the inner face of the die for scraping the material off of that portion of the die not contacted by the face of the rollers, an annular ring having an annular recess within its underside rotatably positioned upon the annular reinforcing ring so that its recess coincides with the projection of the reinforcing annular ring, a plurality of members securing the recessed annular ring to the upper flange of the double flanged member, and a plurality of knife blades secured to the recessed annular ring and tensioned against the outer face of the die.

2. In apparatus of the class described, a supporting frame, a shaft extending vertically within the frame, a die supporting block secured upon the top portion of the frame, a ring shaped stationary die member removably secured to the die supporting block, a double flanged member secured to the shaft and disposed within the area surrounded by the die member, but in spaced relationship with said die member, each flange of said member having a plurality of open ended slots therein, the slots of one coinciding with the slots of the other, a plurality of rollers rotatably retained between pairs of the said coinciding open ended slots, a multi-cammed member rotatably disposed about the hub of said double flanged member, a pair of cam arms secured to each of the rollers and adapted to normally ride against the corresponding cam faces of the multi-cammed member, means associated with the upper flange of the double flanged member for actuating the multi-cammed member to thereby simultaneously move said rollers toward or away from the inner face of the die, a plurality of feeder assemblies, one for each roller, being associated with said rollers and disposed between the flanges of the double flanged member and adapted to slightly compress and direct toward the die the materials being processed, a scraper element, one for each roller, resiliently held against the inner face of the die for scraping the material off of that portion of the die not contacted by the face of the rollers.

3. In apparatus of the class described, a supporting frame, a shaft extending vertically within the frame, a die supporting block secured upon the top portion of the frame, a ring shaped stationary die member removably secured to the die supporting block, a double flanged member secured to the shaft and disposed within the area surrounded by the die member, but in spaced relationship with said die member, each flange of said member having a plurality of open ended slots therein, the slots of one coinciding with the slots of the other, a plurality of rollers rotatably retained between pairs of the said coinciding open ended slots, a multi-cammed member rotatably disposed about the hub of said double flanged member, a pair of cam arms secured to each of the rollers and adapted to normally ride against the corresponding cam faces of the multi-cammed member, means associated with the upper flange of the double flanged member for actuating the multi-cammed member to thereby simultaneously move said rollers toward or away from the inner face of the die, and a plurality of feeder assemblies, one for each roller, being associated with said rollers and disposed between the flanges of the double flanged member and adapted to direct toward the die and slightly compress the materials being processed.

4. In apparatus of the class described, an annular stationary die ring, a plurality of rollers adapted for cooperable engagement with the inner surface of said die ring, all of said rollers being capable of simultaneous adjustment with respect to the said die ring, means disposed adjacent to each roller for directing the material to be molded toward the inner surface of the die ring and the outer peripheral surface of the respective roller.

5. In apparatus of the class described, a plurality of rollers, rotatably driven means for supporting said rollers, a stationary annular die ring surrounding all of the rollers having its inner surface adapted for contact with the outer peripheral surface of each of the rollers, means for simultaneously adjusting the position of the rollers with respect to the inner surface of the die ring, means for directing the materials to be processed toward the outer peripheral surface of each of the rollers whereby, with the rotation of said roller supporting means, the materials being processed will be forced through the die, and means for severing the material as it comes out of the die.

6. Roller supporting and adjusting means to be used with apparatus of the class described, and in combination with said rollers, comprising, a double flanged member, each flange of which has a plurality of open ended slots therein, the slots of one coinciding with the slots of the other, thus forming bearings for the rollers, a roller rotatably retained between each pair of said slots, a multi-cammed member rotatably disposed about the hub of said double flanged member, a pair of cam arms secured to each of the rollers and adapted to normally ride against the corresponding cam faces of the multi-cammed member, and means associated with the upper flange of the double flanged member for actuating the multi-cammed member to thereby simultaneously move said rollers.

7. Apparatus characterized as in claim 6 wherein the means associated with the upper flange of the double flanged member for actuating the multi-cammed member comprises, a pair of gears in mesh with each other, one of which is secured to the multi-cammed member, and a turning knob to which the other of the gear wheels is secured, said turning knob being rotatably positioned with respect to the upper portion of the double flanged member.

8. A feeder assembly to be used with each roller embodied in the apparatus of the class described, comprising, a body member having an angle arm journaled with respect to each roller, the main portion of the body member extending downwardly so that its side lies tangentially adjacent the outer periphery of the roller, a plate hingedly secured to said body member, and means cooperatively connected to said plate whereby said feeder assembly may be adjusted with respect to said roller.

9. In apparatus of the class described, a die supporting block, a stationary cylindrical die removably disposed upon said block, a shaft passing through and vertically disposed with respect to said block and said die, said shaft adapted for rotation, a double flanged member secured to the shaft and confined within the area surrounded by said die, but in spaced relationship with said die, a plurality of rollers rotatably disposed within the double flanged member, said rollers being spaced equi-distant from each other and normally having their respective faces in rotatable contact with the inner face of the die and radially adjustable with respect to the double flanged member, means associated with said double flanged member for simultaneously effecting the radial adjustment of each of the rollers, means depending from the upper flange of the double flanged member and movably disposed with respect to said rollers and capable of adjustment with respect to said double flanged member adapted to slightly compress the material being processed as it directs the said materials toward the die and between the faces of the rollers and the inner face of the die so that said materials may be forced through the openings in the die by the resistance offered by the rollers thereagainst, a plurality of knife blades normally engaging the outer face of the die adapted for severing the compressed material as it is extruded through the die by force of the rollers, means positioned upon said die and operatively secured to the upper flange of the double flanged member, for supporting said knife blades, and means depending from the knife blade supporting means adapted for sweeping the cut pieces of the compressed extruded material toward a central point.

10. In apparatus of the class described, a die supporting block, a stationary cylindrical die removably disposed upon said block, a shaft passing through and vertically disposed with respect to said block and said die, said shaft adapted for rotation relative thereto, a double flanged member keyed to the shaft and confined within the area surrounded by said die, but in spaced relationship with said die, a plurality of rollers rotatably disposed within the double flanged member, said rollers being spaced equi-distant from each other and normally having their respective faces in rotatable contact with the inner face of the die and radially adjustable with respect to the double flanged member, means associated with said double flanged member for simultaneously effecting the radial adjustment of each of the rollers, means depending from the upper flange of the double flanged member and movably disposed with respect to said rollers and capable of adjustment with respect to said double flanged member adapted to slightly compress the material being processed as it directs the said materials toward the die and between the faces of the rollers and the inner face of the die so that said materials may be forced through the openings in the die by the resistance offered by the rollers thereagainst, a plurality of knife blades normally engaging the outer face of the die adapted for severing the compressed material as it is extruded through the die by force of the rollers, and means positioned upon said die and operatively secured to the upper flange of the double flanged member, for supporting said blades whereby rotation is imparted to said means, when the said double flanged member is rotated.

11. In apparatus of the class described, a die supporting block, a stationary cylindrical die removably disposed upon said block, a shaft vertically extending through said block and adapted for rotation relative thereto, a double flanged member secured to the shaft and confined within the area surrounded by said die, but in spaced relationship with said die, a plurality of rollers rotatably disposed within the double flanged member, said rollers being spaced equi-distant from each other and normally having their respective faces in rotatable contact with the inner face of the die and radially adjustable with respect to the double flanged member, means associated with said double flanged member for simultaneously effecting the radial adjustment of each of the rollers, a plurality of knife blades normally engaging the outer face of the die adapted for severing the compressed material as it is extruded through the die, means positioned upon said die and operatively secured to the upper flange of the double flanged member, for supporting said blades, and means depending from the knife blade supporting means adapted for sweeping the cut pieces of the compressed extruded material toward a central point.

12. In apparatus of the class described, a die supporting block, a stationary annular die removably disposed upon said block, a shaft rotatably disposed in vertical position with respect to said block and said die, a double flanged member rotatably secured to said shaft and confined within the area surrounded by said die, but disposed in spaced relationship with said die, a plurality of rollers rotatably disposed within the double flanged member, said rollers being spaced equi-distant from each other and normally having their respective faces in rotatable contact with the inner face of the die and capable of radial adjustment with respect to the double flanged member, means associated with said double flanged member for simultaneously effecting the radial adjustment of each of the rollers, a plurality of knife blades adapted to normally engage the outer face of the die, whereby the extruded material may be severed as it leaves the die, and means positioned upon said die and operatively secured to the upper flange of the double flanged member, for supporting said blades whereby rotation is imparted to said means, when the said double flanged member is rotated.

13. In apparatus of the class described, a die supporting block, a cylindrical stationary die removably disposed upon said block, a double flanged member rotatably disposed within the area surrounded by said die, but in spaced relationship with said die, means for rotating said double flanged member, a plurality of rollers rotatably positioned between the flanges of said double flanged member, said rollers being positioned equi-distant from each other and adapted for radial adjustment with respect to the double flanged member, means associated with said double flanged member for effecting the radial adjustment of each of the rollers, adjustable means associated with said rollers and inclined with respect to the inner face of the die adapted to slightly compress and prevent the materials being processed from packing at the lower end of the die as it directs the said materials toward the die so that the rollers may force the said materials through the die, means for cutting the compressed extruded materials as it comes out of the die, means for holding the cutting means rotatably disposed upon the die and connected to the upper flange of the double flanged member, and means depending from the last mentioned means adapted to sweep the cut pieces of the compressed extruded material toward a central point.

14. In apparatus of the class described, a die supporting block, a stationary cylindrical die removably disposed upon said block, a double flanged member rotatably disposed within the area surrounded by said die, but in spaced relationship with said die, means for rotating said double flanged member, a plurality of rollers rotatably positioned between the flanges of said double flanged member, said rollers being positioned equi-distant from each other and adapted for radial adjustment with respect to the double flanged member, means associated with said double flanged member for simultaneously effecting the radial adjustment of each of the rollers, adjustable means associated with said rollers and inclined with respect to the inner face of the die adapted to slightly compress and prevent the materials being processed from packing at the lower end of the die as it directs the said materials toward the die, means for cutting the compressed extruded materials as it leaves the die, and means for holding the cutting means rotatably disposed upon the die and connected to the upper flange of the double flanged member.

15. In apparatus of the class described, a die supporting block, a cylindrical stationary die removably disposed upon said block, a double flanged member rotatably disposed within the area surrounded by said die, but in spaced relationship with said die, means for imparting rotation to said double flanged member, a plurality of rollers rotatably positioned between the flanges of said double flanged member, said rollers being positioned equi-distant from each other and adapted for radial adjustment with respect to the double flanged member, means associated with said double flanged member for simultaneously effecting the radial adjustment of each of the rollers, adjustable means associated with said rollers and inclined with respect to the inner face of the die adapted to slightly compress and prevent the materials being processed from packing at the lower end of the die as it directs the said materials toward the die so that the rollers may force the said materials through the die, and means for cutting the compressed extruded material as it leaves the die.

16. In a machine for continuous production of pellets and like products, a ring shaped die provided with a plurality of spaced openings through its side, means for rigidly supporting said die, a double flanged member rotatably associated with and confined within the area surrounded by the die, a plurality of rollers adjustably positioned equi-distant from each other within said double flanged member, means for effecting the simultaneous adjustment of said rollers, means indirectly secured to said double flanged member for continuously cutting the compressed extruded material as it leaves the die, and means also indirectly secured to the double flanged member for continuously sweeping the cut pieces of the compressed extruded material toward a central point.

17. A machine characterized as in claim 16 wherein the means for effecting the simultaneous adjustment of the rollers comprises a multi-cammed member rotatably confined between the flanges of the double flanged member, a pair of cam shoes disposed on opposite sides of each roller so that their respective cam surfaces ride upon the corresponding cams of the multi-cammed member, a gear wheel secured to said multi-cammed member, a turning knob rotatably disposed with respect to the upper flange of the double flanged member and a gear wheel disposed below said turning knob, said gear wheel being at all times in mesh with the gear wheel disposed upon the multi-cammed member.

18. A machine characterized as in claim 16 including an annular ring rotatably disposed upon the die and secured to said double flanged cam member, said ring adapted to hold said means for cutting the compressed extruded materials and said means adapted to sweep the cut pieces of compressed extruded material.

19. In a device of the class described, a horizontally positioned perforated die ring, means for supporting said die ring, a plurality of rollers disposed adjacent the inner periphery of said die ring and adapted to compress and force material through the perforations thereof upon relative movement between said die ring and said rollers, means for causing said relative movement, and means disposed adjacent the inner periphery of said die ring for providing individual material feeding throats for each roller, said means including a shielding structure individual to and for the space between adjacent rollers with the number of structures corresponding to the number of rollers, to thereby retain the fed material within the vicinity of the die ring and prevent substantial escape of material to the central zone of the assembly, each of said structures including a pair of members operatively mounted and connected to provide a throat wall adjustable to vary the cross-sectional dimensions of the throat at will, whereby the throat is of decreasing width toward the roller with which it co-operates with the rate of decrease variable independent of the roller.

20. An assembly as in claim 19 characterized in that one of the structure members has its mounting co-related with the axis of its roller with the other member pivotally connected to and trailing relatively to the first member.

21. In a device of the class described, a horizontally positioned perforated die ring, means for supporting said die ring, a plurality of rollers disposed within the area confined by said die ring and adapted to compress and force material through the perforations thereof upon relative movement between said die ring and said rollers, means for causing said relative movement, a shaft for each of said rollers, means for supporting said shafts individually to withstand thrust conditions on the roller with which the shaft is associated, said supporting means being common to all of the shafts with the means operative to provide concurrent adjustment of the shaft positions, and a member common to the shafts and having openings within which the shafts are disposed and guided radially.

22. An assembly as in claim 21 characterized in that the shaft-supporting means has a camming relationship with each of the shafts and is operative to provide mutual thrust resistance between diametrically-opposed shafts.

23. In apparatus of the class described, an annular die ring, a plurality of rollers adapted for co-operable engagement with the inner surface of said die ring, all of said rollers being supported for radial adjustment to compensate for wear, adjusting means for the rollers and concurrently operative on the rollers to thereby provide mutual support between rolls to resist thrust in any of the adjusted positions, and an individual feeding throat for each roller for directing material to be extruded to the point of contact of roller and ring.

24. An assembly as in claim 23 characterized in that the adjusting means includes a camming element co-operative concurrently with each of the roll shafts to provide for concurrent adjustment of the rolls to an equal value.

25. An assembly as in claim 23 characterized in that the adjusting means includes a camming element having symmetrical camming faces corresponding to the number of rollers and their shafts, each roller shaft having a supporting element contacting a zone of a camming face of the camming element with the contacting zones similarly positioned for all of the rollers, whereby the camming element serves to operatively support diametrically-opposed shafts to mutually resist thrust of diametrically opposite rollers.

26. In a device of the class described, a horizontally-positioned perforated die ring, a plurality of rollers disposed within the area confined by said die ring and adapted to compress and force material through the perforations thereof upon relative movement between said die ring and the rollers, means for causing such relative movement, a shaft for each of said rollers, a member positioned adjacent an end of said rollers and having radial slots to receive the respective roller shaft ends to permit adjustment of shafts and to limit such adjustments to radial directions, and means co-operative concurrently with the respective shafts to provide concurrent adjustment of the rolls radially as determined by the member slots, whereby wear of rolls may be compensated concurrently with the adjusting means active as a thrust-resisting element mutually active with diametrically-opposed rollers.

27. An assembly as in claim 26 characterized in that the adjusting means includes a camming element having camming faces corresponding to the number of rollers, each roller shaft having a supporting element co-operative with the camming face therefor.

DUANE CRABTREE.